US007113985B2

(12) United States Patent
Narad et al.

(10) Patent No.: US 7,113,985 B2
(45) Date of Patent: Sep. 26, 2006

(54) ALLOCATING SINGLES AND BURSTS FROM A FREELIST

(75) Inventors: Charles E. Narad, Los Altos, CA (US); Larry B. Huston, Wexford, PA (US); Alok Mathur, Milipitas, CA (US); Gregory L. Limes, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 789 days.

(21) Appl. No.: 10/272,506

(22) Filed: Oct. 15, 2002

(65) Prior Publication Data

US 2004/0073635 A1 Apr. 15, 2004

(51) Int. Cl.
*G06F 15/177* (2006.01)

(52) U.S. Cl. ...................... 709/221; 709/212; 709/214; 711/110; 710/52

(58) Field of Classification Search ................ 709/221, 709/212, 214; 711/110; 710/52; 379/418–419
See application file for complete search history.

(56) References Cited

U.S. PATENT DOCUMENTS

| 5,136,582 | A | * | 8/1992 | Firoozmand | ................. | 370/400 |
| 5,299,313 | A | * | 3/1994 | Petersen et al. | ............ | 709/234 |
| 6,055,619 | A | * | 4/2000 | North et al. | .................. | 712/36 |
| 6,526,451 | B1 | * | 2/2003 | Kasper | ........................ | 709/250 |
| 6,625,689 | B1 | * | 9/2003 | Narad et al. | ................. | 711/110 |
| 6,889,345 | B1 | * | 5/2005 | Sicola et al. | .................. | 714/43 |
| 6,938,148 | B1 | * | 8/2005 | Moore et al. | ............... | 712/216 |

\* cited by examiner

*Primary Examiner*—Frantz B. Jean
(74) *Attorney, Agent, or Firm*—Fish & Richardson P.C.

(57) ABSTRACT

A mechanism that enables allocation and recovery of buffer resources in both burst access and single access modes of operation is presented.

35 Claims, 11 Drawing Sheets

ALLOCATING SINGLES AND BURSTS FROM A FREELIST

BACKGROUND

When managing a pool of memory locations for allocation to hardware devices or to code running on processors, the pool is generally implemented as a data structure called a "freelist". A freelist may contain a list of pointers (addresses) of these locations, or may be constructed of a linked list built of free entities. Standard structures for implementing a freelist include first-in, first-out (FIFO) queues and last-in, first-out (LIFO) stacks. A FIFO of pointers is often implemented as a ring buffer in a memory accessible to all participating agents. Since this is a pool of free elements, there is no particular preference in the allocation order since all free elements are equivalent.

The memory locations on a freelist may be buffers, descriptors, memory pages, or any other item which can be randomly allocated and returned (recovered) by software and/or by hardware devices.

There are systems in which heterogeneous agents are accessing this freelist. For example, in an I/O device there may be a software driver allocating transmit buffers and/or descriptors and recovering retired receive buffers and/or descriptors, and a hardware device allocating them for receive and recovering retired ones for transmit. For simplicity of design, it is likely that the software will want to allocate/recover a single entity at a time, while for efficiency a hardware device would be designed to allocate a group of entities at one time.

Some prior mechanisms force devices to allocate/return single entries in a transaction; others implement two separate pools, one for the allocation/return of singles and another for the allocation/return of bursts. The case of the two pools requires that the software monitor the size of each pool and rebalance the pools by copying entities between them as needed to keep either pool from becoming empty. This software task is undesirable, and is especially onerous, if the common flow is for buffers and/or descriptors to pass back and forth between an I/O device and software, unless the receive and transmit flows are guaranteed to be symmetrical.

DETAILED DESCRIPTION

Figure 1:
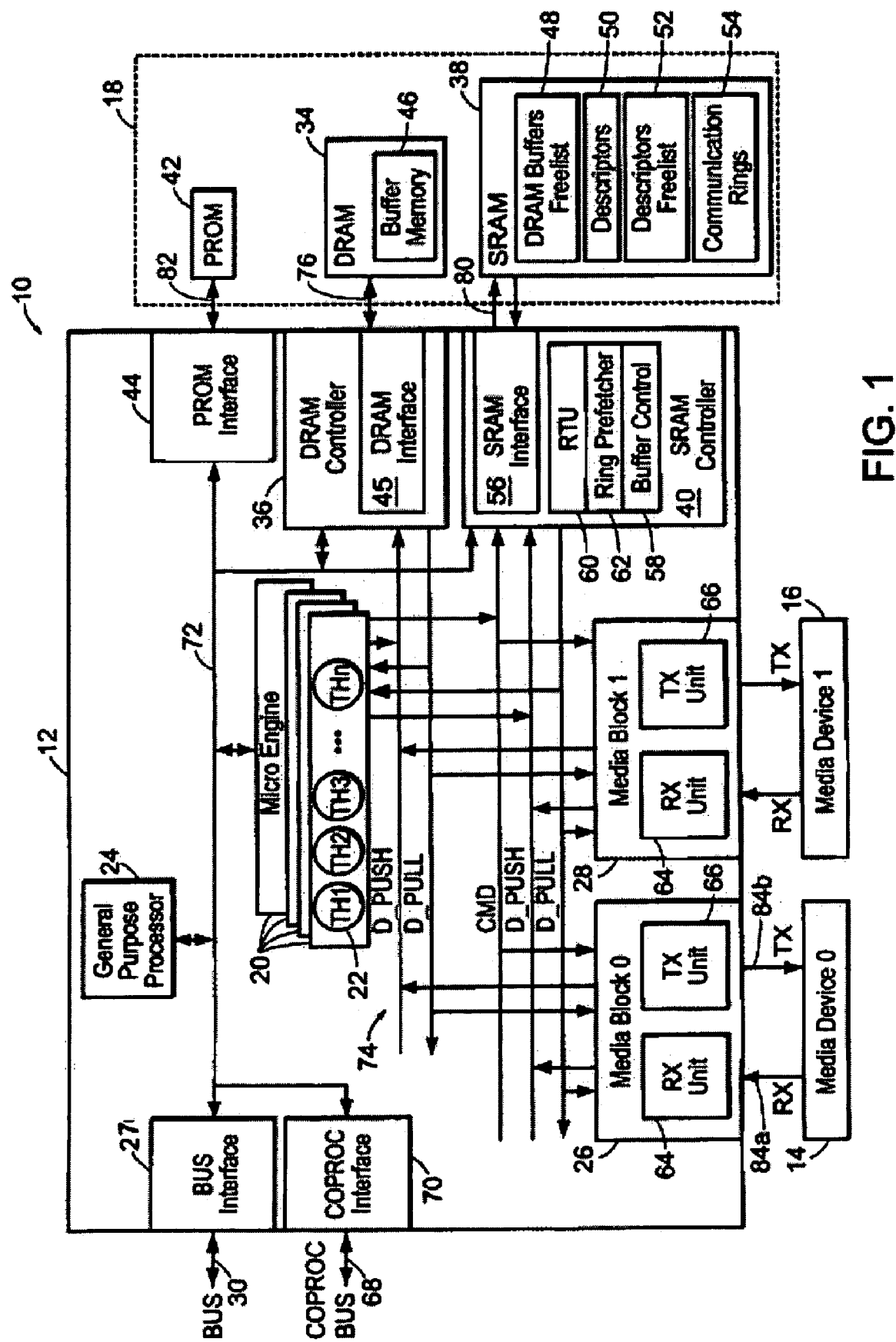
FIG. 1 is a block diagram of a communication system employing a processor having multi-threaded microengines to support multiple threads of execution.

Referring to FIG. 1, a communication system 10 includes a processor 12 coupled to one or more I/O devices, for example, network devices 14 and 16, as well as a memory system 18. The processor 12 is multi-threaded processor and, as such, is especially useful for tasks that can be broken into parallel subtasks. In one embodiment, as shown in the figure, the processor 12 includes multiple microengines 20, each with multiple hardware controlled program threads 22 that can independently work on a task. Each of the microengines 20 is connected to and can communicate with adjacent microengines.

The processor 12 also includes a general purpose processor (GPP) 24 that assists in loading microcode control for the microengines 20 and performs other general purpose computer type functions such as handling protocols and exceptions, as well as provides support for higher level processing tasks that cannot be handled by the microengines. The GPP 24 has an operating system through which it can call functions to operate on the microengines 20. The GPP 24 can use any supported operating system, preferably a real-time operating system.

The microengines 20 each operate with shared resources including the memory system 18, a bus interface 27, and one or more media blocks 26 and 28. The bus interface 27 provides an interface to an external bus 30, e.g., the PCI (Peripheral Component Interconnect) bus. The media blocks 26, 28 are responsible for controlling and interfacing the processor 12 to the network devices 14, 16, respectively. The memory system 18 includes a Dynamic Random Access Memory (DRAM) 34, which is accessed using a DRAM controller 36, and a Static Random Access Memory (SRAN) 38, which is accessed using an SRAN controller 40. The memory system 19 also includes a nonvolatile memory 42 such as a PROM and corresponding interface 44 to support boot operations. The DRAM 34 and DRAM controller 36 are typically used for processing large volumes of data, e.g., processing of payloads from network packets. The DRAM controller 36 includes a DRAM interface 45 for accessing buffer memory 46 within the DRAM 34. The buffer memory is used to store packet data, either payloads or complete packets. The SRAN 38 and SRAN controller 40 are used in a networking implementation for low latency, fast access tasks, e.g., accessing look-up tables, memory for the processor 24, and so forth. The SRAN 38 stores DRAM buffer freelists (lists of pointers to available buffers in the buffer memory 46) 48, descriptors 50 and descriptor freelists 52 and communication rings 54 for passing information, e.g., descriptor pointers, between the processor's resources, such as the microengine threads 22, GPP 24 and media blocks 26, 28. The SRAN controller 40 includes an SRAN interface 56 that is used for accessing data stored in the SRAN 38, and buffer control logic 58 to support allocation of the DRAM buffers represented in the freelist 48 to requesting resources. Also included in the SPAN controller 40 is a Ring Translation Unit 60 which, in conjunction with a ring prefetcher 62, is used by the resources to access the rings 54, as will be described in further detail later. The microengines 20 can execute memory reference instructions to either the DRAM controller 36 or the SRAN controller 40.

The devices 14 and 16 can be network devices capable of transmitting and/or receiving network traffic data, such as framing/media access control devices, e.g., for connecting to 10/100 BaseT Ethernet, Gigabit Ethernet, ATM or other types of networks, or devices for connecting to a switch fabric. The media blocks 26, 28 therefore support one or more types of interfaces, such as an interface for packet and cell transfer between a PHY device and a higher protocol layer (e.g., link layer), or an interface between a traffic manager and a switch fabric for Asynchronous Transfer Mode (ATM), Internet Protocol (IP), Ethernet, and similar data communications applications. The media blocks 26, 28 each include a separate receive (RX) unit 64 and transmit (TX) block 66, each being separately configurable for a particular interface supported by the processor 12.

Other devices, such as a host computer and/or bus peripherals (not shown), which may be coupled to the bus 30 controlled by the bus interface 27, or a coprocessor (also not shown), which may coupled to a coprocessor bus 68 controlled by a coprocessor interface 70, are also serviced by the processor 12.

In general, as a network processor, the processor 12 can interface to a communication device or interface that receives/sends large amounts of data. The processor 12 operating as a network processor could receive units of packet data from a network device like network device 14 and process those units of packet data in a parallel manner, as will be described. The unit of packet data could include an entire network packet (e.g., Ethernet packet) or a portion of such a packet, e.g., a cell or packet segment.

Each of the functional units 20, 24, 27, 36, 40, 44 and 70 of the processor 12 is coupled to a first bus structure 72. The functional units 20, 26, 28, 36, 40 are coupled to a second bus structure 74. Memory busses 78, 80 couple the memory controllers 36 and 40, respectively, to respective memory units DRAN 34 and SRAM 38 of the memory system 18. Memory bus 82 couples the PROM interface 44 to the PROM 42 of the memory system 18. The media blocks 26, 28 each are coupled to their respective network devices 14 and 16 via separate I/O bus lines 84a and 84b, respectively.

Although not shown in detail, each microengine 20 includes a write transfer register file and a read transfer register file. The write transfer register file stores data to be written to a resource external to the microengine (for example, the DRAM memory or SRAM memory). The read transfer register file is used for storing return data from a resource external to the microengine 20.

Figure 2:
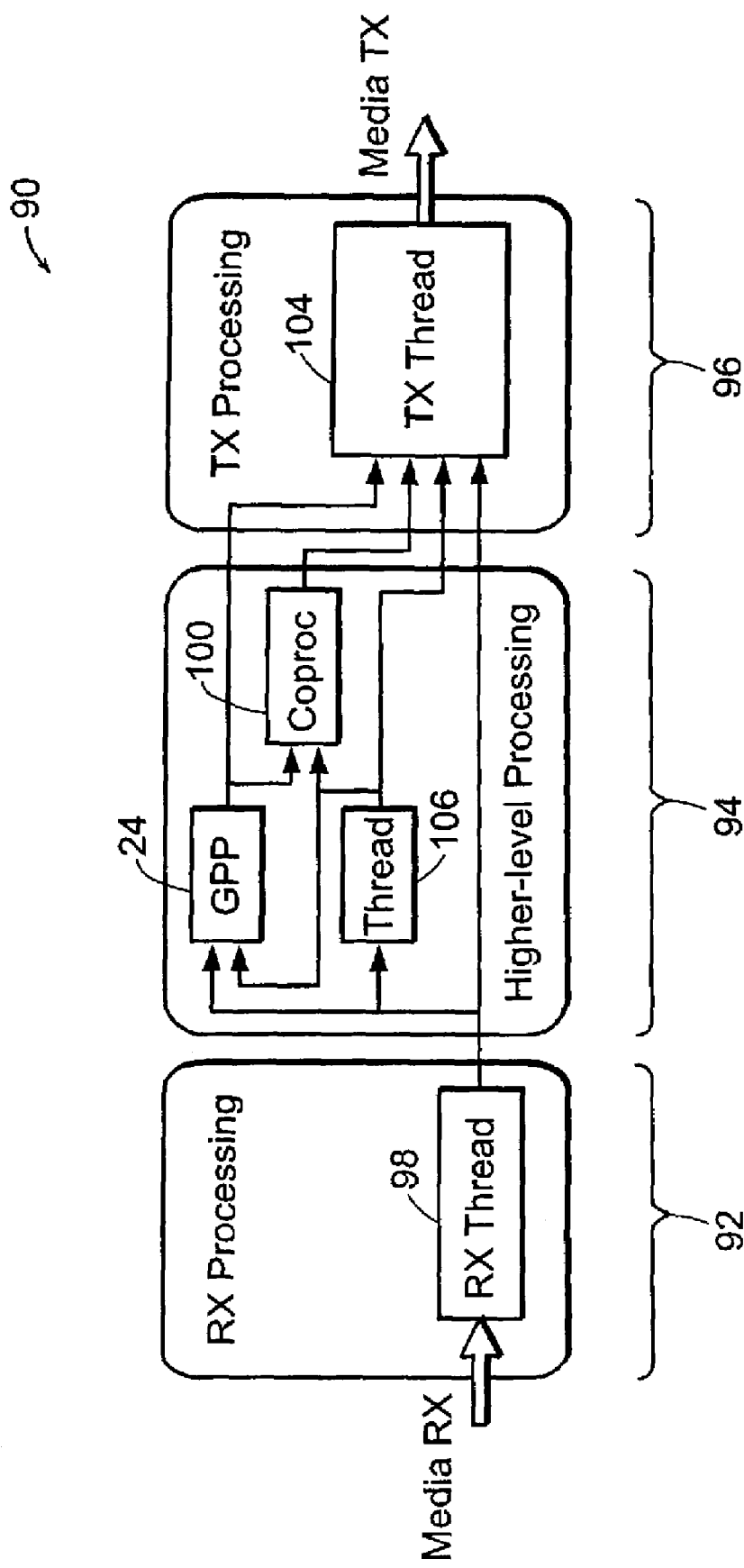
FIG. 2 is a depiction of the high-level processing flow of the processor.

Referring to FIG. 2, an exemplary software model 90 of the processor 12 is shown. The processor 12 supports three levels of processing or stages: a receive processing stage 92, a higher-level processing stage 94 and a transmit processing stage 96. In the receive processing stage, such operations as re-assembly pointer search, re-assembly information update, receive packet processing and queue management are performed. Thus, the processing during the receive processing stage begins with data arriving in a receive unit of the I/O interface media blocks and ends with storing descriptors in SRAM and moving payload data to DRAM. In the transmit processing stage, a number of operations are performed, including transmit scheduling, queue management and data transmit.

The receive thread 98 parses packet headers and performs lookups based on the packet header information. Once the packet has been processed, it is either forwarded as an exception to be further processed by the core GPP 24, another thread 100 or coprocessor 102 for higher-level processing, or is stored in the DRAM 34 and queued for transmit by placing a descriptor for it in a transmit queue associated with the transmit (forwarding port) indicated by the header/lookup. The descriptors are stored in the SRAM 38. At the transmit processing stage 96, the TX thread 104 performs the transmit data processing, that is, sending the packet out onto a forwarding port indicated by the header/lookup information during the receive processing.

Collectively, the various stages form a pipeline. The pipeline uses multiple microengines 20 in parallel, and each thread in each ME is assigned a single packet for processing.

Cells and frames generally need to be kept in order within a flow for either reassembly into frames or for transmission. Since groups of thread are used to provide parallelism and improve throughput, order is maintained by careful sequencing of cooperative threads.

Figure 3:
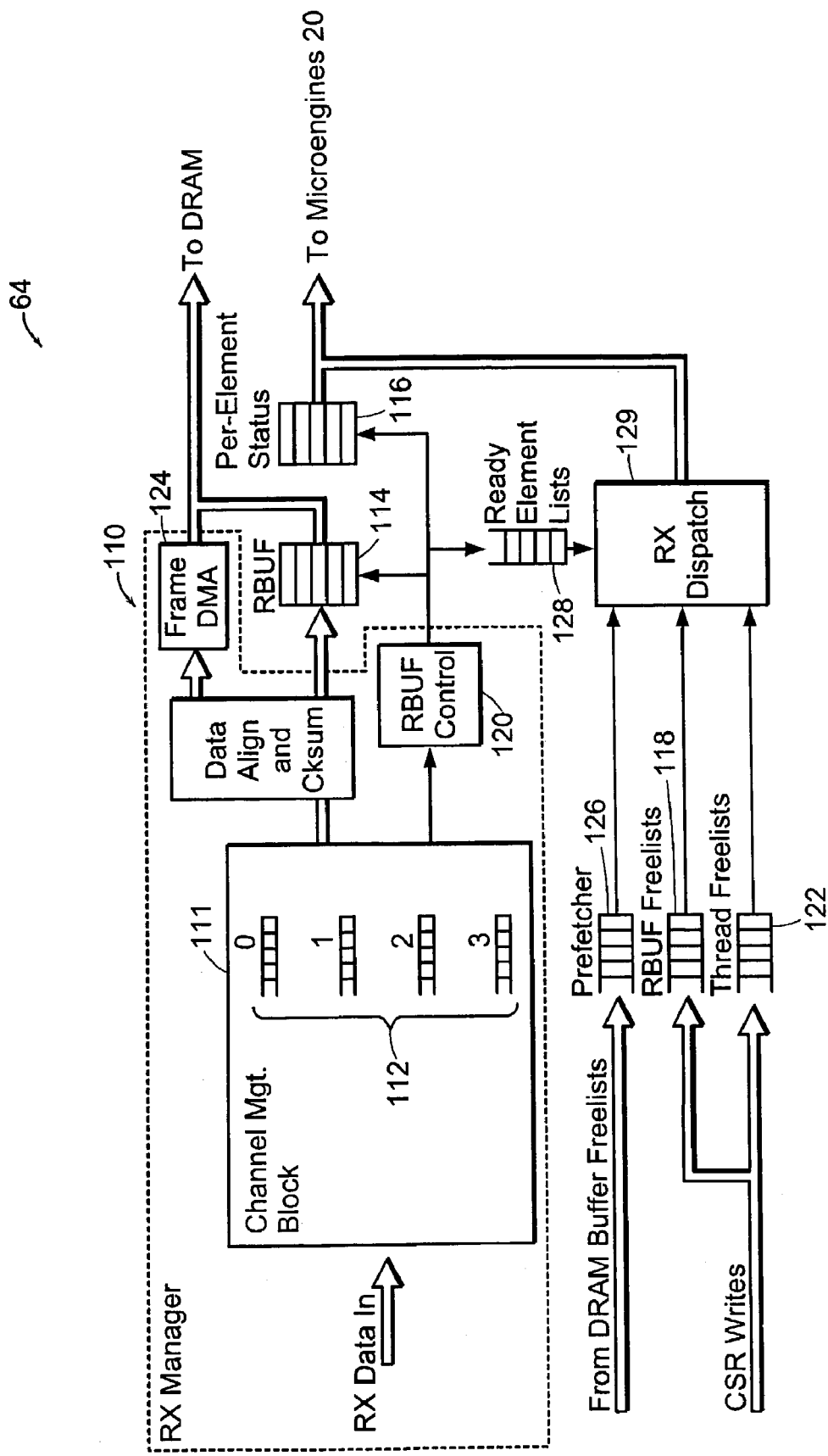
FIG. 3 is a block diagram of a receive unit of the processor.

Referring to FIG. 3, the functional units and data structures of the media block receive (RX) unit 64 are shown. This unit is replicated in the media block 0 and media block 1 of FIG. 1. The RX unit 64 includes an RX manager 110, which includes a channel management block 111 to manage multiple channels 112. In one embodiment, these channels can operate independently as 8-bit UTOPIA or POS, or as Ethernet MAC. Pairs of channels can be combined to provide 16-bit UTOPIA or POS, or all four channels can be combined into a 32-bit UTOPIA, 32-bit POS or 8/16/32-bit MPHY UTOPIA. In MPHY mode, all resources of the entire media block are allocated independently of the MPHY bus width. The RX unit 64 also includes a receive buffer array (RBUF) 114 and an array of status 116. The status array 116 stores status context associated with each entry in the RBUF 114. Each entry is identified by an index which is delivered to an assigned RX thread as part of the RX status, and is returned by the RX thread to an RBUF freelist 118. Data is placed in RBUF 116 by an RBUF controller 120, and can be read by a thread using an instruction which specifies an offset into the array, a number of units to read, and the first transfer register into which the data is to be moved.

A thread indicates to the receive unit that it is ready to process received cells or frames by writing its thread ID into a thread freelist 122. Ths is done by issuing a CSR write to the thread freelist register CSR for the list it is using. The presence of the thread ID on the thread freelist 122 indicates that the thread has reserved its SRAM read transfer registers to receive the RX status words.

Receive hardware assigns threads to cell/packets in the same order that the threads were enqueued onto the freelist.

There can be multiple thread freelists in the receive unit, each with its own CSR addresses. Each channel in the channel management block 110 is configured to use a particular thread freelist. This allows a single freelist to serve one or multiple channels as desired by the system programmer.

There can also be multiple RBUF freelists. Each channel is configured to use one of them, so each RBUF freelist 118 could serve one or several channels as desired. The RBUF controller 120 assigns an RBUF element from the RBUF freelist 118 to hold received data, and passes the RBUF number (index) to a thread as part of the receive status. Once the thread is done reading the contents of the RBUF element, it returns the entry to the RBUF freelist 118 by issuing a CSR write to the associated RBUF freelist CSR address.

The RX unit allocates the RBUF elements to hold the first 64 bytes (including prepad) of a received frame or an entire cell by reading it from the RBUF freelist bound to that RX channel.

Any channel that is configured for frames automatically uses a DMA engine 124 to store the body of the frame (everything after the first 64 bytes including pad) into a buffer in DRAM 34. The data is written into a DRAM buffer starting at an offset of 64 bytes from the 64-byte aligned buffer pointer, leaving room for a processing thread to insert the edited headers at a later point.

The RX unit 64 includes a prefetcher 126 to prefetch pointers to DRAM buffers from the DRAM buffers freelist 48 in the SRAM 38. For efficiency, the pointers can be prefetched from the DRAM buffer freelist 48 in bursts. The prefetcher can also receive pointers to buffers retired by the TX unit from the TX unit directly. That is, the TX unit can recirculate DRAM buffers directly to the RX prefetcher 126 instead of returning them to the DRAM buffers freelist 48.

Also included is a ready-element list 128 which is used by the RBUF controller 120 to post a cell or frame as completed and ready for assignment to a thread, and a dispatcher 129 which does those assignments.

Four RX thread freelists enable groups of threads to assign themselves in FIFO order to service a port of group of ports. Each media channel is statically configured to use thread from one of these lists, and each list could be serving more than one channel. Similarly, there are four RBUF freelists into which retired RBUF entries are returned. These represent up to four closed pools of buffers assigned to a port or group of ports, with a similar static binding of each channel to one of the lists, such that a list can serve one or many channels. The RBUF pools allow system software to partition the 64 buffers as desired among different ports possibly running at radically different arrival rates. Since each media block can be partitioned into up to 4 channels, these pools allow for flexible division of resources and independent queueing among the different channels.

Figure 4:
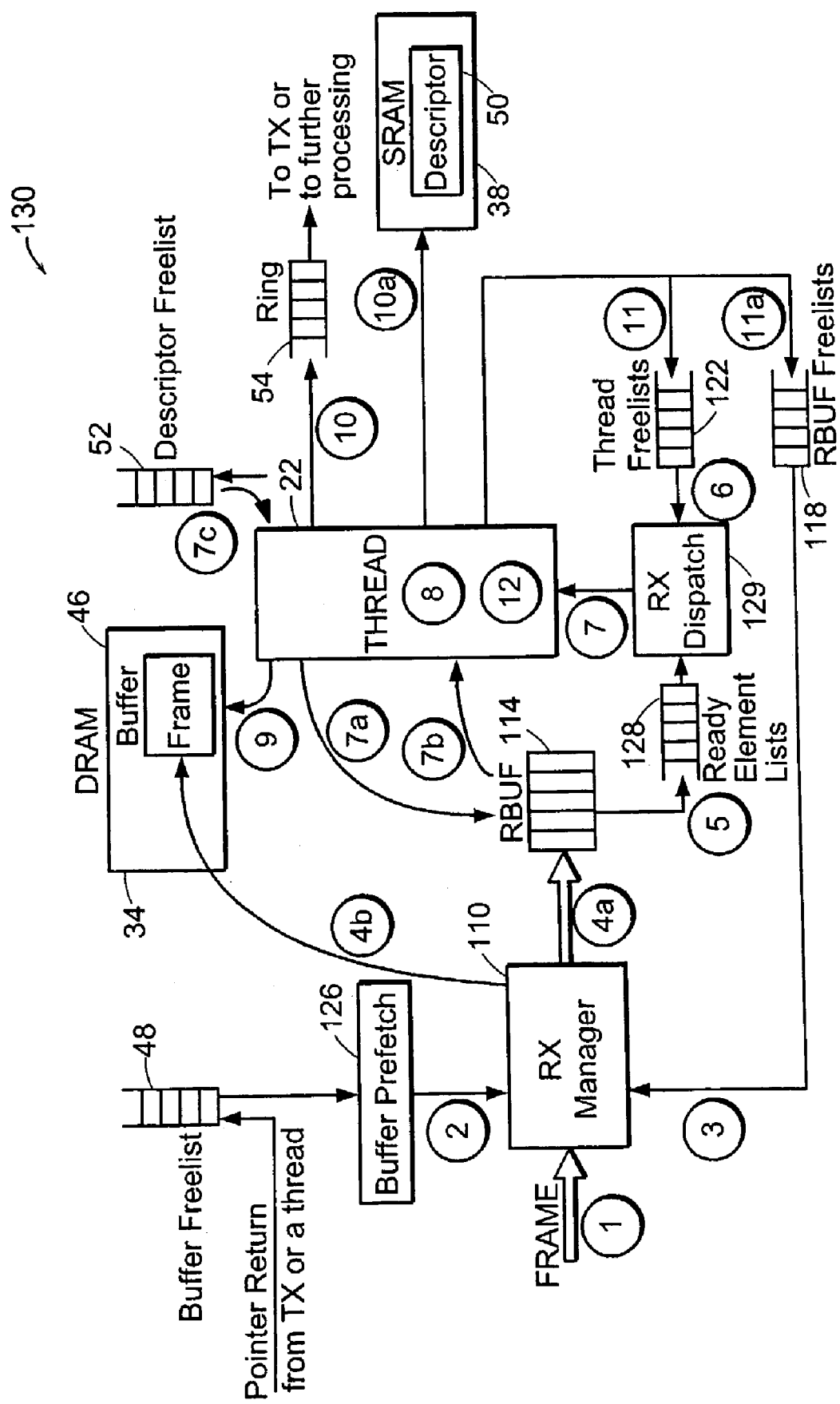
FIG. 4 is a depiction of an exemplary receive data path.

Referring to FIG. 4, an exemplary sequence of events in receiving a cell or frame 130 is as follows. The media RX interface 110 starts to receive a frame or receives a cell into its internal buffers (transaction 1, as indicated by the arrow labeled "1"). If the received data unit is a frame, the interface 110 allocates a buffer prefetched from the DRAM buffer freelist (transaction 2). It also allocates a free RBUF element from the receiving channel's RBUF freelist (transaction 3). The interface 110 moves the cell or packet from the media RX interface (transaction 4). The first 64 bytes is moved into the allocated RBUF entry (transaction 4a). If a frame, the remainder of the frame is written into the DRAM buffer starting at an offset of 64 bytes (transaction 4b). When the entire cell or frame has been received, the status is complete and the element is posted on the ready elements list for the channel (transaction 5). A thread is allocated from the channel's thread freelist (transaction 6). The dispatcher pushes the status to that thread's read transfer registers (transaction 7). Status includes such information as frame length, media specific bits (including specific status, the VCI/VPI if a cell, and the Ethernet CRC if an Ethernet frame), the channel ID, the timestamp and the buffer pointer.

The assigned thread issues a read of the contents of RBUF (transaction 7a). The thread receives the data from RBUF into the SRAM read transfer registers (transaction 7b). In the case of a cell, it might only read the payload since it has the VCI/VPI already. Optionally, the thread may also allocate a descriptor from the descriptor freelist for the frame (transaction 7c). The thread parses the headers, does lookups and comparisons (transaction 8). If a frame, the thread edits the headers as appropriate. If performing a SAR of cells, the thread assembles the payload into a frame buffer, and also computes the incremental CRC for this cell (fetching, modifying and the writing back the CRC residue in progress for this frame). If the thread is forwarding cells, it allocates a cell buffer and writes the modified cell into it.

If a frame, the thread must write the edited headers into the DRAM buffer to complete the frame image in DRAM (transaction 9). The headers written to the DRAM buffer could be longer, shorter or identical to the headers that were received.

If forwarding frames or cells, when a frame is complete, the thread places the buffer pointer or an associated descriptor pointer into one of the hardware-managed rings 54, thus passing it to either a TX thread, or to further processing on another thread or on the GPP 24. If a descriptor was allocated, it is filled in SRAM before it is forwarded. When done, the thread posts itself as available by writing its Thread ID to the thread freelist (transaction 11). The thread returns the RBUF element to its RBUF (transaction 11a). It will be appreciated that a thread could choose to return the RBUF element any time after transaction 7b.

The decoupling of packet receive from thread assignments provides for better elasticity if transient events cause temporary slow downs in the thread processing for this channel. A ready-elements list per channel is needed to prevent slow threads on one channel from blocking progress on receive for another channel.

Group of threads provide parallelism for processing a single stream of packets or cells coming from a channel, but need to access certain per-channel and per-flow information in sequential fashion, in arrival order for the cells or frames being processed. They also need to sequentially enqueue themselves on the freelist to maintain receive order. The sequencing among the threads uses the concept of sequential exclusion locks, or s_mutexes, to implement this sequencing.

Figure 5:
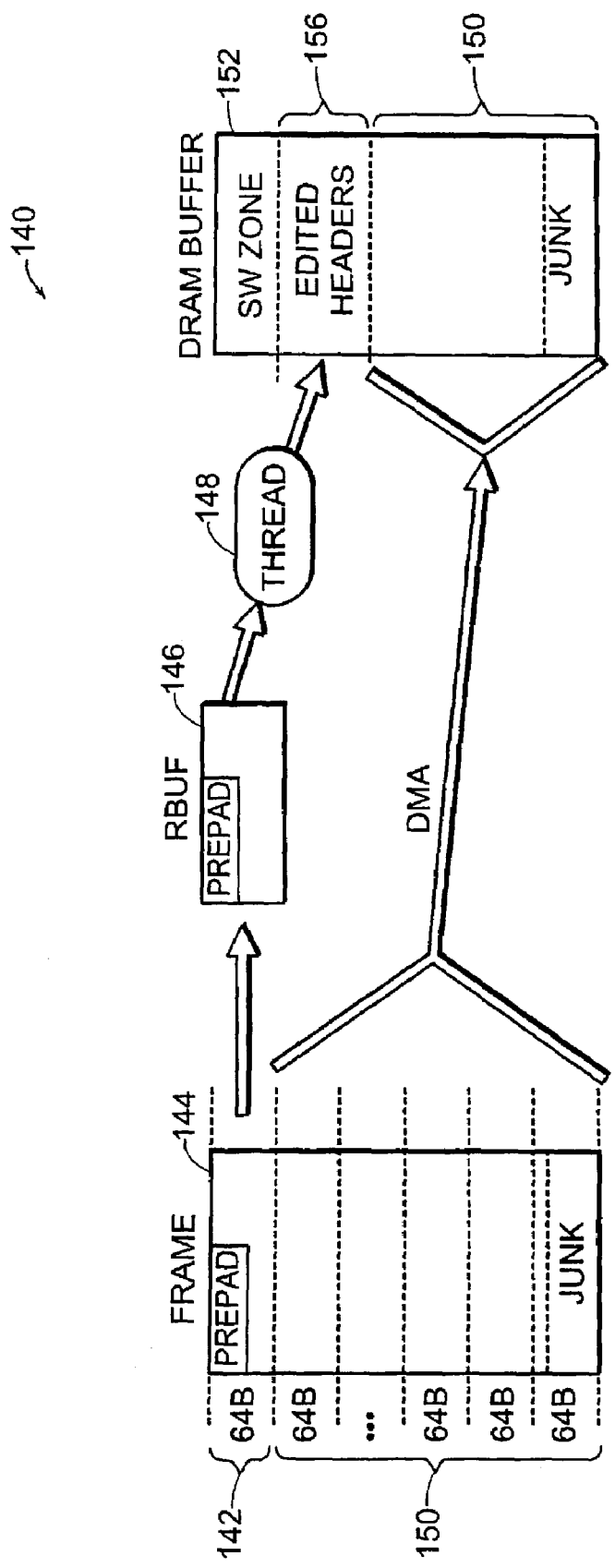
FIG. 5 is a depiction of data movement during a receive operation.

On the receive path, as noted earlier, the processor 12 implements "header-splitting". The mechanics of the header splitting mechanism 140 are shown in FIG. 5. Referring to FIG. 5, a leading portion (shown as the first 64 bytes) 142 of a frame (or an entire ATM cell) 144 is captured in an RBUF entry 146. The remaining portion 150 (of the frame) is DMA'ed into a DRAM buffer 152 allocated by the RX unit 66. When the tail of the frame or cell is received, a thread is allocated from a freelist bound to the media port, and status about the received cell or frame is pushed into the read transfer registers of the thread. The thread parses the status, fetches the cell or leading portion of the frame from RBUF 146 and processes it. If the contents of the RBUF are part of a frame, the thread prepends the processed leading portion onto the rest of the frame in the DRAM buffer. If the RBUF stores a cell, the thread either allocates a buffer for cell forwarding, or appends the cell to a frame assembly buffer if further SAR processing is required. If more than 64 bytes are needed for classification, the thread fetches the rest from the packet buffer in DRAM. A pointer for that cell or frame is passed either to the core or to another thread for further processing, or to a thread for transmit. Hardware-managed rings are used for this communication, as discussed earlier.

Figure 6:
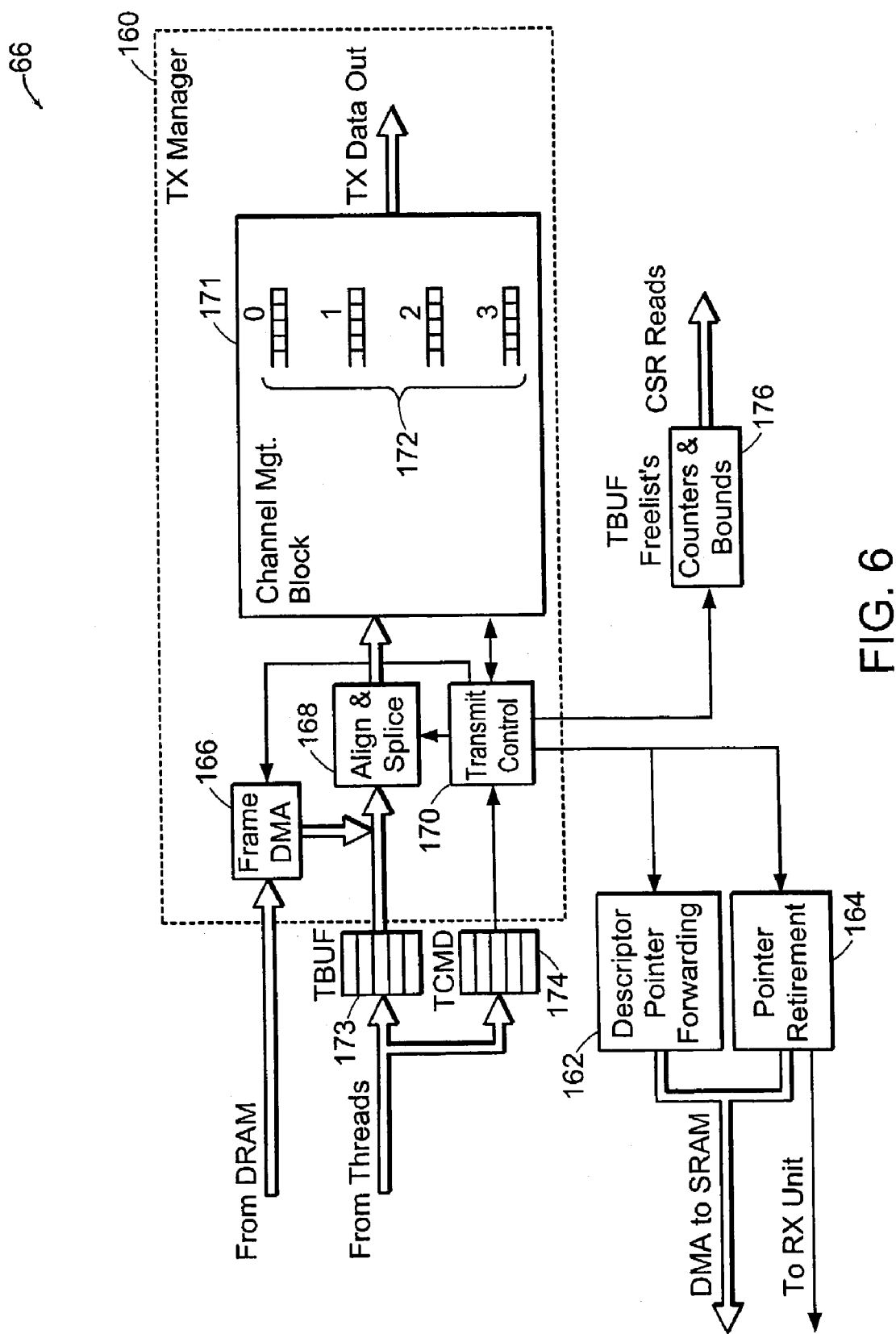
FIG. 6 is a block diagram of a transmit unit of the processor.

Referring to FIG. 6, details of the TX unit 66 are shown. The functional units of the TX unit 66 include a TX manager 160, a descriptor pointer forwarding unit 162 and a pointer retirement unit 164. The TX manager 160 includes a DMA engine 166, an align and splice unit 168, a transmit control unit 170 and a channel management block 171. The channel management block 171 manages multiple channels 172 for transmitting data. Also include are various data structures used by the TX unit 66. The data structures include a transmit buffer array (TBUF) 173, a transmit command array (TCMD) 174, and TBUF freelists 176. The TBUF 173 includes 64 entries of 64 bytes each. The TCMD 174 stores a 16-byte command context associated with each entry in the TBUF 172. Each entry in the TBUF 172 is identified by an index which is delivered to a thread when the thread is reading the TBUF 173, and is returned to the appropriate TBUF freelist 176 when the entry is retired. Data is placed in the TBUF 173 by a thread using a command which specifies an offset into the array with 8-byte granularity, a number of 8-byte units to write, and the first transfer register from which the data is to be moved. The TBUF freelists are implemented as up-counters which have information on the last valid number that can be allocated.

Although the data is written into TBUF at an 8-bytes alignment, it is possible to instruct the TX unit to skip up to 7 leading bytes in the TBUF entry before starting to transmit the data. The transmit command also specifies the number of bytes to transmit from TBUF up to 64-bytes including the skip field, and a byte-arbitrary address in DRAM plus a DRAM byte count indicating which data to splice to the data from TBUF, if any. This mechanism allows for prepending arbitrary headers onto an arbitrarily aligned payload. Flags indicate if data is present in TBUF and in DRAM.

Writes to the TBUF 173 are ordered with respect to writes to the TCMD 174. The TX manager 160 ensures that if one or more writes are issued to the TBUF 173, they completed prior to a subsequent write to the TCMD 174.

Each TBUF element has a corresponding Transmit Command (TCMD) entry, which is accessed with the same TBUF index number that was allocated from the TBUF freelist 176. Writes into the command section must be completed as a single 16-bytes transaction. The write into a TCMD entry commits the transmit operation to occur. TCMD entries are processed in FIFO order by index number, so hardware only looks for the 'committed' status on the next entry. A thread allocates a TBUF element, writes prepend data (if any) into TBUF at that index, then writes the commands to TCMD at that index. The hardware guarantees that these two writes complete in order. Writing into a TCMD entry marks it as ready for processing. The TX hardware processes the TCMD entries in order by index number, so TCMD behaves as a fifo. By using an s-mutex around allocation, the unit guarantees ordered transmit among a group of cooperating threads if desired.

Any channel that is configured for frames automatically uses the DMA engine 166 to fetch the DRAM portion of the frame if instructed to do so in the transmit command. That is, the DMA engine is driven by the command descriptors issued into the TCMD 174. The DMA engine 166 can fetch data starting at any arbitrary byte address and splice it to the TBUF "prepend" data, if any.

After the TX manager 160 completes a transmit, it takes a 32-bit opaque cookie from the TCMD command and treats it as either a buffer pointer (which may be different from the pointer to the first byte to transmit) to retire, or as a token such as a descriptor pointer to pass to a thread or to the GPP 24 for further processing.

Figure 7:
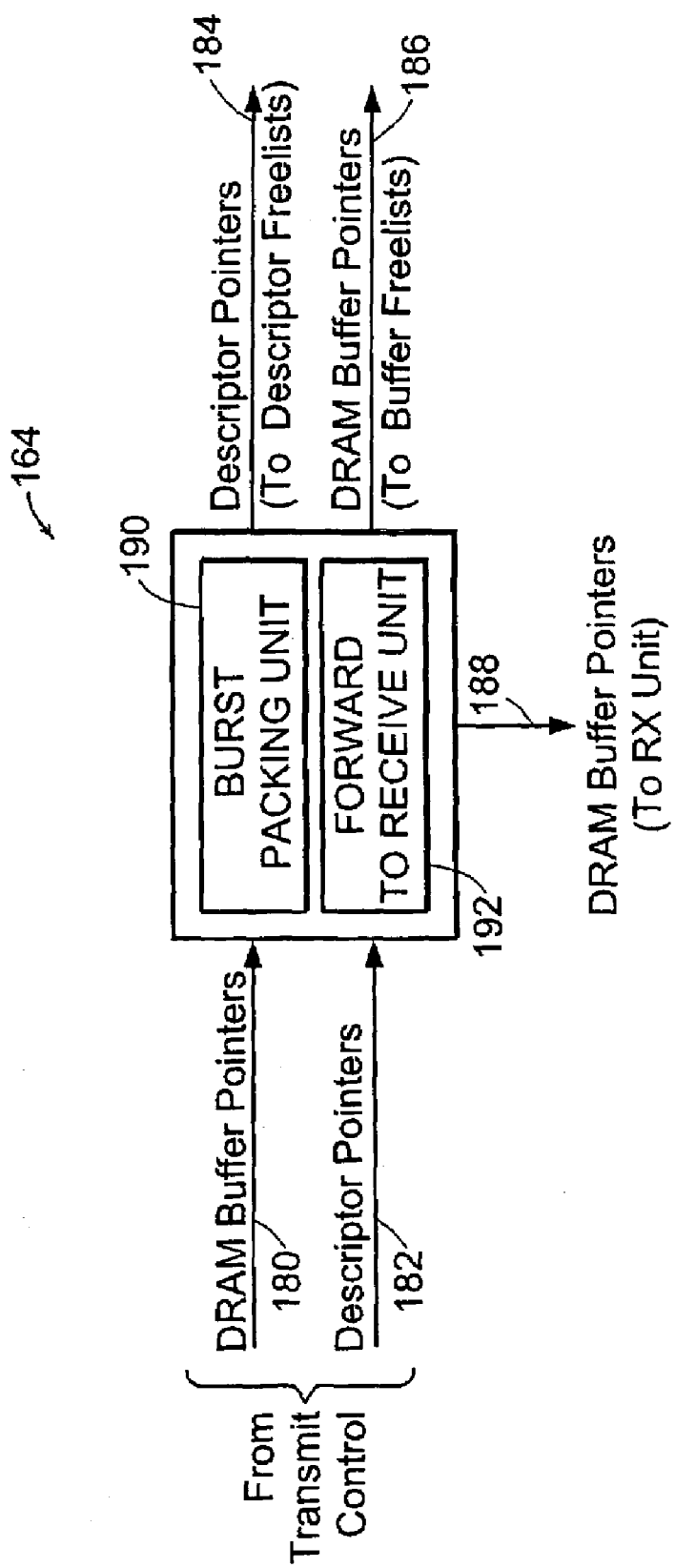
FIG. 7 is a depiction of an exemplary transmit data path.

Referring to FIG. 7, the TX buffer retirement unit 164 receives as inputs 180 and 182 from TX control unit 170 DRAM buffer pointers and descriptor pointers, respectively. The unit 164 has three outputs, output 184, output 186 and output 188. At output 184 the unit 164 provides retired descriptor pointers to the descriptor freelists 52 in SRAM 38. More specifically, the unit 164 uses a ring in SRAM to communicate the return of the descriptor to the freelist. With respect to the DRAM buffer pointers, the unit 164 can operate in two modes. It includes a burst packing unit 190 and a forward-to-receive unit 192. At output 186 the burst packing unit 190 returns the retired DRAM buffer pointers to the DRAM buffer freelist in SRAM. The burst packing unit 190 packs the retired buffer pointers into groups (e.g., groups of 16 pointers) and returns the groups of pointers to the DRAM buffer freelist 48 (in SRAM 38) in a burst, or returns each buffer pointer individually, i.e., in order to reach an alignment that enables burst writes. Thus, the burst packing unit has the ability to accumulate a plurality of descriptor pointers and/or buffer pointers which are directed to a particular freelist, so that multiple entities may be returned in a single transaction.

Alternatively, as an option to enhance performance, via output 188, which connect the unit 164 to the RX unit's RX buffer prefetcher 126, the forward-to-receive unit 192 recirculates the retired DRAM buffer pointers (and therefore the DRAM buffers) to the RX buffer prefetcher 126. The forward-to-receive unit therefore has the ability to forward retired resources such as descriptors and/or buffers to an associated receiving I/O device, for use by that device in buffering received data, and generating descriptors for that data to be set to a post-receive processing element.

Thus, it is the goal of the retirement unit to determine if a particular transfer requires software post-processing and forward the resources to a designated processor if so, or recover the resources to freelists automatically if software is not required in the loop. Grouping returns allows one to amortize the memory access cost per return; to recirculate to reduce traffic from both allocation and return; and to burst prefetch by RX to amortize memory access cost upon allocation. By eliminating unnecessary software intervention, processing cycles are freed up for more important work.

A field in the descriptors indicates if the descriptor should be forwarded to post-processing or if the resources should be recovered by hardware to the freelists. Another field in the descriptors can be used to indicate which freelist to receive the retired resources if there is greater than or equal to one freelist, i.e., to support pools of different sized buffers.

Alternatively, the retirement unit could include a configuration mechanism to statically configure the target rings and freelists for the hardware recovery and forwarding functions.

The recovery unit reduces software overheads for buffer management in devices such as networking interfaces, storage devices and generic DMA engines by enabling the transmit (send) hardware to recover retired buffers and/or descriptors back to freelists without software intervention, and further to make a determination on a transfer-by-transfer basis as to whether the resources of a particular transmit should be sent to software for post-processing and eventual recovery, or whether the hardware can do the recovery.

It also allows the transmit hardware to provide retired resources such as buffers and descriptors to an associated receive unit in order to optimize receive performance and to reduce memory traffic to and from the freelists.

Figure 8:
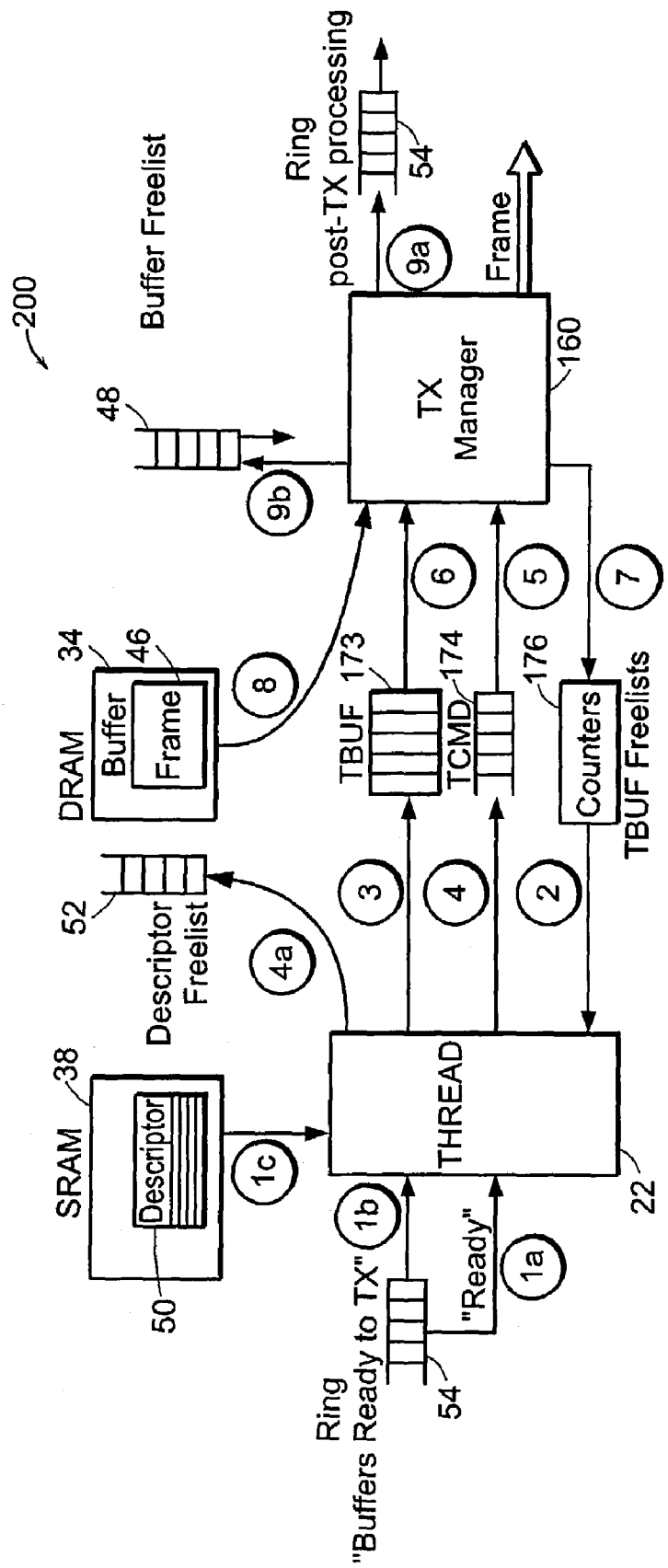
FIG. 8 is a depiction of data movement during a transmit operation.

Referring to FIG. 8, an exemplary sequence of events in transmitting a cell or frame (transmit flow) is shown. For the model where a thread is servicing a ring, the thread wakes up on a signal indicating there is work to do (at least one frame buffer pointer or descriptor in the ring) (transaction 1*a*). The thread reads the ring to obtain the pointer (transaction 1*b*). If descriptors are used, the thread reads it from memory (transaction 1*c*).

The thread allocates a TBUF and TCMD entry by reading an index from the TBUF freelist for the destination channel. If all TBUF elements for that channel are currently in use, the index indicates 'invalid' and the thread polls until one becomes available. If the thread is part of a group of sequenced threads, the allocation is done inside of a serial mutex (transaction 2).

Optionally, the thread writes up to 64 bytes of data into the TBUF[index] to be prepended, that is, to be transmitted first (transaction 3). If performing a SAR operation, the CRC of the frame can be computed incrementally as each cell moves through a thread, and the final cell can be modified or generated as needed to carry the CRC.

The thread writes the transmit descriptor to TCMD[index], which includes the size (0–64 bytes) and alignment (0–7 bytes) of the data just written into TBUF, and information about the rest of the frame coming from memory (transaction 4). The descriptor includes the following:

A) "SOP in TBUF" flag to indicate if a prepend is to be executed;
B) an associated "skip bytes" value of 0–7, to select the alignment of the start of the prepend data, and the byte count of valid bytes in the TBUF to be transmitted;
C) "EOP in TBUF" flag to indicate if there is no further packet data from memory to fetch. Otherwise, the descriptor includes:
D) DRAM starting address with arbitrary alignment, allowing for skipping some of the packet in memory;
E) Memory byte count;
F) A 32-bit opaque cookie which contains either the buffer pointer for return to the freelist, or some other pointer (e.g., to a descriptor) to place on a ring for post-processing;
G) Buffer pointer retirement information, either a ring number to schedule the cookie for post-TX processing, or a flag indicating that the cookie is to be returned to the DRAM buffer freelist.

If a descriptor is used and it is not being retired post-transmit, the thread retires the descriptor back to its allocation pool (transaction 4*a*).

When ready for the next frame, the channel in the TX manager waits until the TCMD command associated with the next index is valid, then reads the transmit descriptor from TCMD (transaction 5). If the command indicates that there is are prepend data in the TBUF, the channel fetches data from the associated TBUF element (transaction 6) and returns the TBUF element to the TBUF freelist (transaction 7). If there is data in a memory buffer, the TX manager channel fetches and transmits that data (transaction 8). Buffer and descriptor retirement occur. The retirement unit does one or the other of the following. It enqueues the opaque cookie onto a designated ring for post-TX processing by a microengine or the GPP (in which case software is eventually responsible for returning the buffer(s) to the DRAM buffer freelist) (transaction 9*a*), or retires the buffer pointer, either to the DRAM buffer freelist by way of the burst packer or recirculates it to the RX prefetcher (transaction 9*b*).

Figure 9:
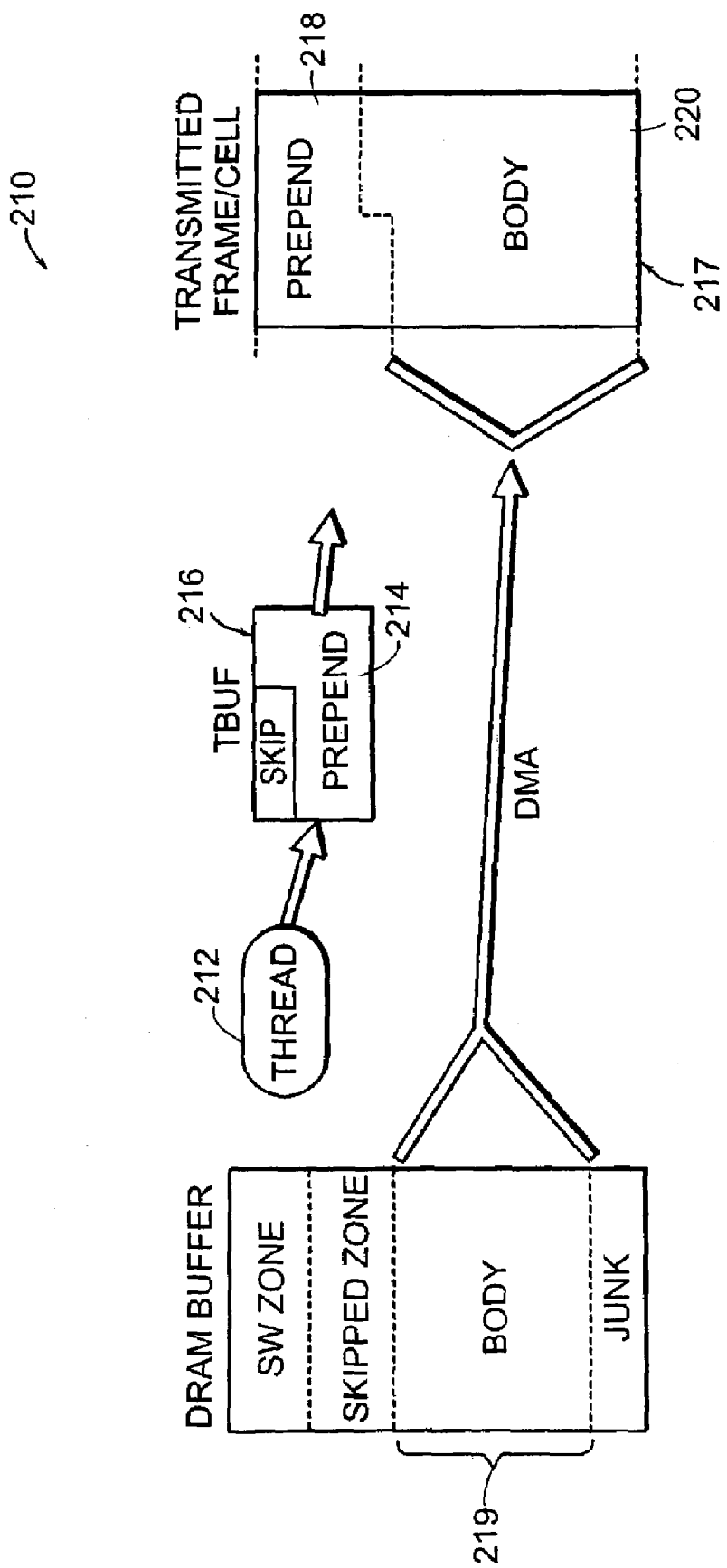
FIG. 9 is a block diagram of a pointer retirement unit within the transmit unit.

The mechanics of the header splicing data movement 210 are shown in FIG. 9. A thread 212 can write up to 64 bytes of prepend data (or an entire cell or small packet) 214 into a TBUF entry 216 that it has allocated, then pushes a command descriptor into the TCMD. The transmit unit then prepares a cell or frame 217 for transmit. The transmit unit processes the command descriptor and transmits the TBUF contents (a precise number of bytes, after skipping up to 7 bytes as instructed) 218 and then fetches the remainder of the frame 219, if any, from an arbitrary byte address in DRAM and splices that to the prepend data as a body portion 220 of the frame 217. The retirement unit is instructed in the command descriptor to either recover the buffer to a buffer freelist upon retirement, or to forward a descriptor pointer via a hardware ring to a thread or to the GPP for post processing.

The TX header splicing thus optimizes the movement of data required to form network frames for transmit. Headers to be prepended to a frame are generated by a processing element into a fast transmit buffer memory, while the remained of the frame resides in a larger, more distant frame buffer memory. The transmit hardware places these elements together to form a frame as it is being sent to the media. The header splicing is done in order to minimize the memory traffic to and from the large, slow buffer memory and to minimize the processor cycles spent copying, merging and realigning data.

It is desirable for the RX DMA to allocate pointers to buffers from the DRAM buffer freelist in a burst so as to minimize the number of memory transactions required on average to service a receive operation, and also to make the most efficient use of each allocation memory access. At the same time, it is also desirable for software running on a processing element to be able to allocate a single buffer when needed, thus avoiding the need for the software to keep track of additional, prefetched buffers that would happen if the software allocated a burst of pointers. Similarly, when returning retired buffers, it is desirable to have the hardware batch them into bursts for the same reasons, while allowing the software to return only single entities and not have to track accumulating a burst of them.

Figure 10:
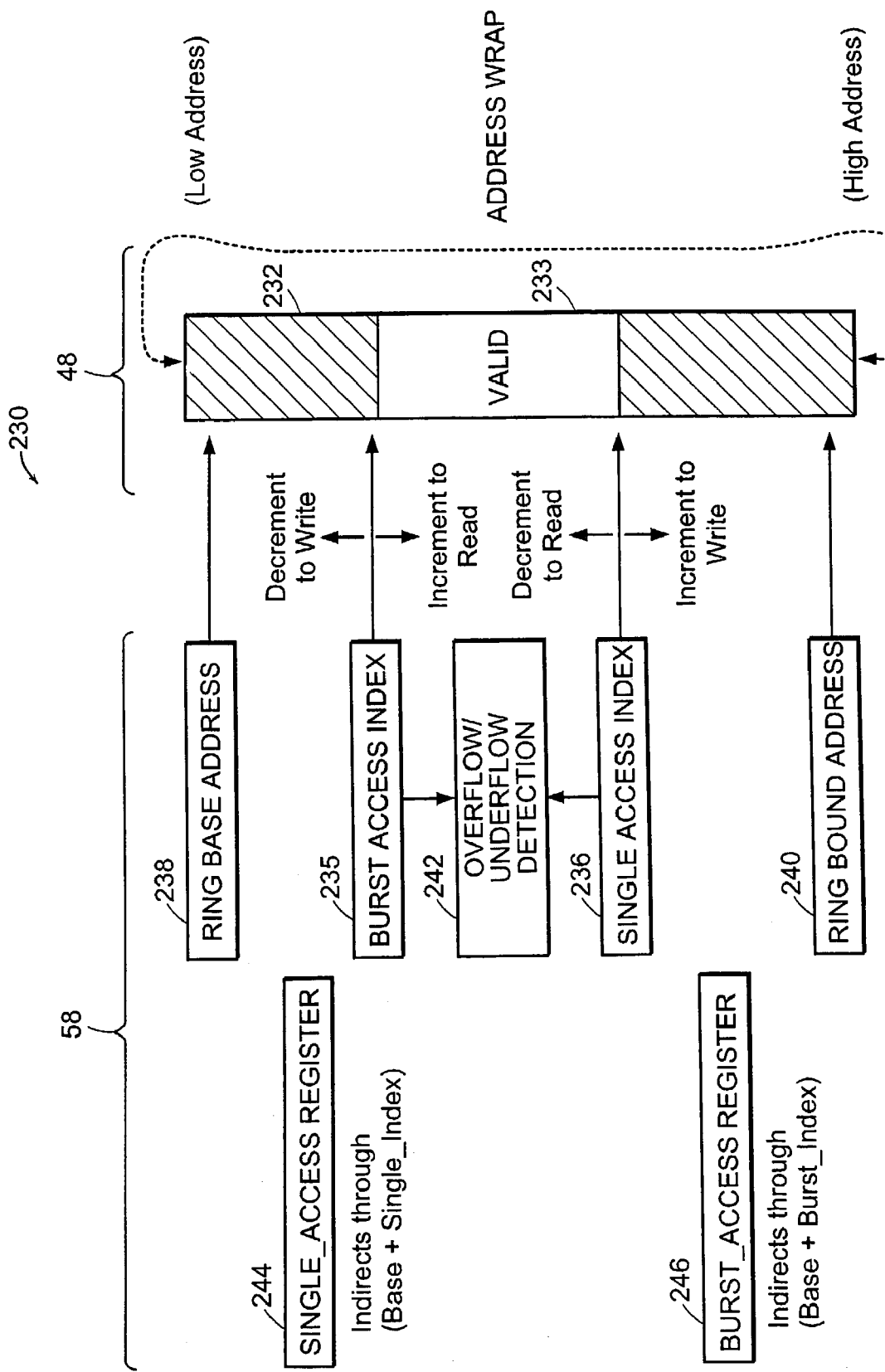
FIG. 10 is a block diagram of an exemplary embodiment of the DRAM buffer freelist and related buffer control logic (from FIG. 1) using a two-headed allocation ring structure.

FIG. 10 shows how the two different access behaviors are optimized in a single freelist ring structure. In one embodiment, the buffer freelist data structure 48 is implemented as a ring buffer which behaves as two LIFO stacks, one end of the ring used for allocating and returning single entries and the other end of the ring used for allocating and returning burst of these entities. Thus, with this implementation, the media receive unit 64 allocates buffers in bursts and the transmit unit 66 packs up the retired buffers and returns them in bursts as well. Other users such as the GPP and the microengine threads can allocate and return a single buffer at a time to the other end of the list, to and from the same pool of buffer pointers.

In the embodiment of FIG. 10, the buffer freelist 48 includes a memory array 232 having a contiguous valid region 233. The buffer control 58 includes hardware index registers 235 and 236 for storing pointers to two heads-of-queue, the register 234 providing an index pointer for burst access and the register 236 providing an index pointer for single access. These registers are used to locate the next address to read or write in the ring data structure in memory. An alternate embodiment could use a dedicated RAM to control the freelist(s).

The buffer control 58 also includes monitors 238 and 240 for the values of the pointers 235 and 236, respectively, so as to implement the "wrapping" feature of a ring buffer, and access size monitors 242 to enforce correct use of the two access points to the ring. Also included is a mapping from two register addresses 244, 246 to the indirect memory location currently pointed to by the index registers. These register addresses are indirected through in order to access the associated head-of-queue for single or burst access. As with traditional ring buffer implementations, accesses wrap when high or low bound of the memory range for this ring is exceeded. The burst- and single-access index registers (including a hidden "wrap" bit) are compared to associated thresholds in order to detect underflow and overflow conditions. Since burst accesses to DRAM may be aligned to the size of the burst, the burst index may be size-aligned (e.g., on a 64-byte boundary for 64-byte burst accesses).

The "wrap" bit is an extension to the index counter. Basically, in a standard hardware implementation of a ring, "full" or "empty" is determined by comparing the "produce" ("write") and "consume" ("read") index pointers. In order to disambiguate between "full" and "empty", the index counters must have one additional high-order bit beyond those necessary to index into the ring array in memory. If the indexes are equal including this wrap bit the ring is empty, while if the indexes are equal except for the wrap bit then the ring is full.

While the figure shows the "valid" region as being contiguous, it can be in two pieces, one at the bottom of the ring array in memory and the other at the top—they are virtually contiguous since the addresses wrap to produce the circular buffer ("ring") data structure.

The ring base address register 238 defines the start of the ring data structure allowing software to control the location of the data structure.

There are no ordering rules among the reads and writes to the buffer freelist 48. Since it is a pool of available entries, there is no reason to enforce order. This allows for hardware optimizations.

The buffer prefetcher (in the RX unit 64) caches one or more bursts of entries fetched from the allocation pool using the burst access index 235, and the retirement burst packer (in the TX unit 66) accumulates single retired entries until an entire burst is present, at which time it can be recovered (written) back to the freelist, again using the burst access index 235 to the pool.

The retirement unit can also recirculate retired buffers back to the RX unit's buffer prefetcher cache so as to minimize both the number of times the RX prefetcher needs to access the pool in memory to allocate and receive buffers and the number of times TX retirement unit access the pool in memory. A key concept is that the transmit (or send) unit processes a descriptor and buffer, and then retires them, while the RX unit allocates a buffer and usually descriptor in order to have some location in which to place received data and its status. In a traditional design, the software is involved in retiring receive buffers/descriptors back to the freelist after it is done with them, and must also be involved in recovering retired transmit buffers/descriptors after the transmit hardware has notified the software that the associated transmit operation has completed. As discussed above, the TX/RX hardware recovers the transmit resources without software intervention. By allowing the TX unit to recirculate retired transmit resources to the RX unit, the media blocks are able to maintain a cache of resources and reduce trips to the shared buffer freelist of resources.

A possible extension of this concept is to enable variable-number-of-entry burst accesses using the (alignment-insensitive) single index path.

Figure 11:
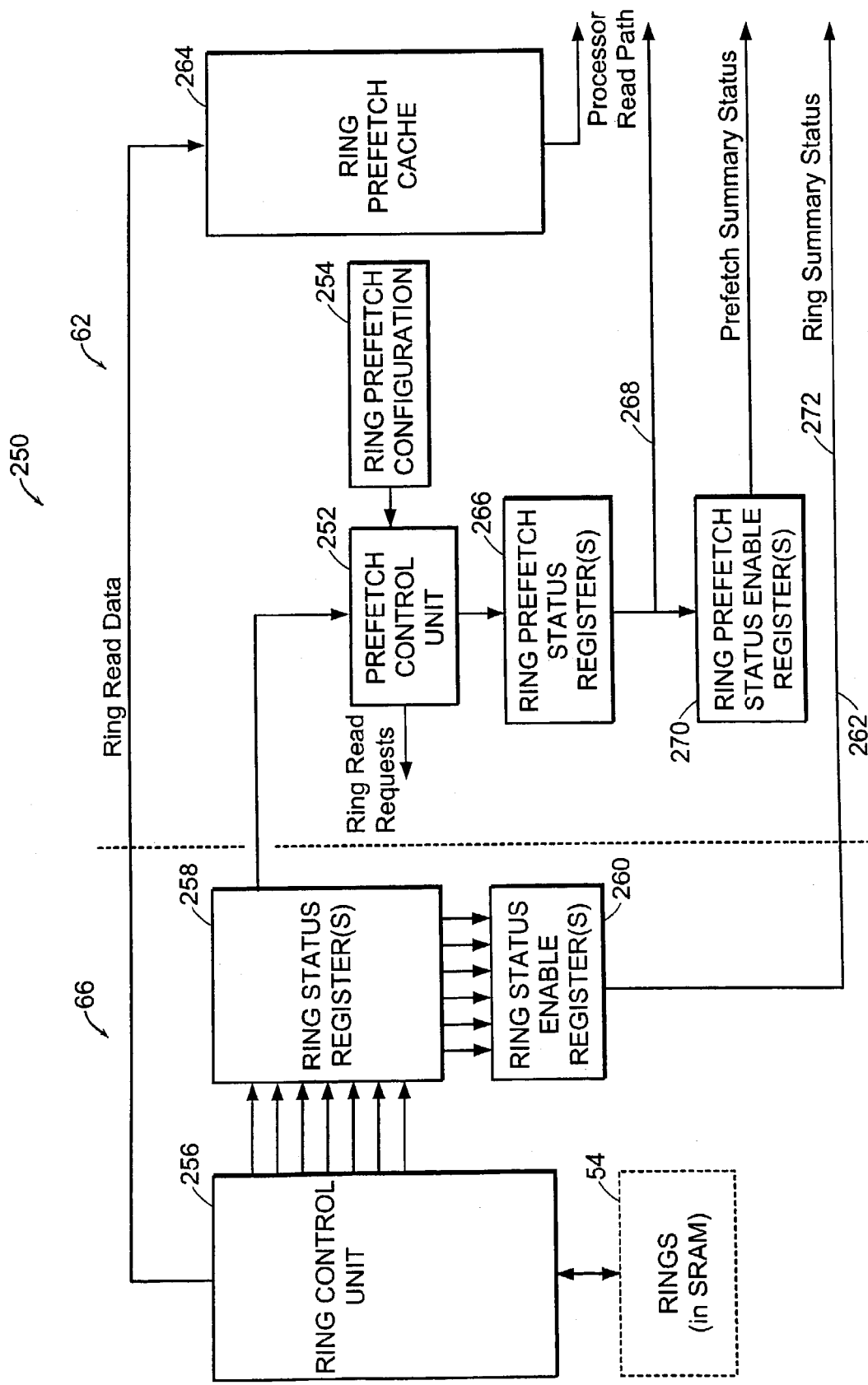
FIG. 11 is a detailed block diagram of the ring translation unit and associated ring prefetcher (shown in FIG. 1).

FIG. 11 shows a ring access mechanism 250 which includes the Ring Translation Unit (RTU) 60 and associated ring prefetcher 62 for accessing the communication rings 54 (shown in dashed lines)(from FIG. 1). For simplification, a single prefetcher is shown as being resident in the SRAM memory controller. However, each agent wishing to access a ring may have its own local prefetcher capability for optimized use. The prefetcher 62 includes a prefetch control unit 252, as well as one or more configuration registers 254. The configuration registers are used to select which rings are to be prefetched from by the prefetch control unit 252. Alternatively, the prefetcher 62 can maintain a list (e.g., a bit vector) from which to select individual rings to prefetch, or a high and low bound of ring ID numbers to prefetch.

The RTU 60 includes a ring control unit 256 to read the rings 54 and ring status registers 258, set by the ring control unit 256, to provide status signals for indicating per ring if the ring contains at least one valid element ("ring not empty"). The status registers pack multiple such signals into a word which is accessible by a processor as a system register. Optionally provided are ring status enable registers 260. One enable register for each status register provides a bit-wise select of which bits in the status register contribute to a summary status signal 262 which indicates that this register has at least one of the selected bits asserted. Such a summary status signal is likely seen as a bit in a higher-level status register in an interrupt or status register hierarchy. The use of the enables is to select only those rings that are not being prefetched to contribute to the summary status, since those are the only bits in the register that indicate the need for service.

The ring prefetcher 62 includes a memory or set of registers used as a ring prefetch cache 264. Although shown in FIG. 1 as being located in the SRAM controller, the ring prefetch cache 264 (as well as other portions of the prefetcher 62) could be located close to GPP or microengines to provide significantly lower read access latency than either system registers or system memory. One entry of the ring prefetch cache 264 is assigned to each of the rings being prefetched. An example of the close/fast interface is the "coprocessor register" port on many commercially available embedded microprocessors. Thus, the prefetch control unit 254 initiates a ring read operation to the ring control unit 256, which places the resulting data into the ring prefetch cache 264.

The ring prefetcher 62 also includes ring prefetch status registers 266, each corresponding to a different ring status. These registers are managed by the prefetch control unit 252 and are read by the various resources (e.g., microengine thread, GPP) via a processor read path 268. Optionally, the ring prefetcher 62 can include ring prefetch status enable registers 270. The registers 270 include an enable register for each of the ring prefetch status registers 266, thus providing the same type of functionality as described for the status register enables 260. The use of these enables is to select only those rings which are being prefetched to contribute to a prefetch summary status 272 for the ring prefetch status registers.

The prefetch control unit 252 tracks the "valid" status of each of the ring prefetch cache entries, and signals that status to the processor via the ring prefetch status registers 266 along the read path 268. It also detects when the processor reads an entry in the ring prefetch cache and, if the entry is valid, provides the data to the processor and deasserts the corresponding status. If the entry is invalid, the prefetch control unit 252 provides "0×0" (null) to the processor so as to mimic the behavior of the ring. For each ring selected for prefetch in the configuration registers 254, the prefetch control unit 252 monitors the status of that ring by examining that ring's status in the ring status registers 258. It detects if the ring-not-empty status for that ring is asserted, and that the corresponding entry in the ring prefetch cache is not valid. If both conditions are true, the prefetch control unit 252 issues a read of the head-of-queue of that ring (a "consume access"). It places the read data into that ring's entry in the ring prefetch cache and asserts that ring's bit in the associated ring prefetch status register.

With appropriate memory system support, the prefetch control unit can issue multiple outstanding read requests in order to provide optimal system performance. Since there is a time lag between a read of the ring and clearing of "ring not empty" status in the shadow copy of that status, the prefetch control unit must enforce a rule such that it does not issue fetches to a particular ring between the time it reads from the ring and the time correct updated status for that ring is reflected in the shadow. There are many techniques for enforcing such a rule, which should be obvious to one skilled in the art.

The prefetcher can be designed to prefetch and cache multiple valid ring entries at a time.

Support for a local or shadow copy of the ring status may be included in the prefetcher 62. Thus, the prefetch control unit 252 could examine its own local copy of the ring status instead of having the ring status delivered to the prefetch control unit 252 from the ring status registers 258 in the RTU 60.

There may be other applications of the status- and content-prefetching portions that are unrelated to rings, for example, by prefetching mailbox contents.

Often a communications mechanism such as hardware-managed rings spends a significant amount of the per-message time budget just getting the message. The ring prefetching technique can accelerate common and known overheads in such a system in order to free up more processing cycles per message time budget, thus allowing an increase in either the supportable throughput or the computer-per-message capabilities in such systems without changing the processor speed.

Other embodiments are within the scope of the following claims.

What is claimed is:

1. An apparatus comprising:
   a memory that stores addresses of memory resources in a ring structure of entries;
   a processing device coupled to the memory; and
   logic, coupled to the processing device and the memory, usable by the processing device to access entries in the ring structure both in bursts and singly.

2. The apparatus of claim 1 wherein the logic includes a first pointer and a second pointer for separately indexing into the ring structure, the first pointer usable by the processing device to access entries in bursts and the second pointer usable by the processing device to access entries singly.

3. The apparatus of claim 2 wherein the first pointer is stored in a first register and comprises a first index value and the second pointer is stored in a second register and comprises a second index value.

4. The apparatus of claim 3, wherein the logic further comprises:
   logic that operates to increment the first index value for burst read access to buffer addresses and to decrement the first index value for burst write access to buffer addresses; and
   logic that operates to decrement the second index value for single read access to read buffers and to increment the second index value for single write access to write buffers.

5. The apparatus of claim 3 wherein the first register and the second register store an indicator in association with the index values to indicate, when the first and second index values are equal, if the ring structure contains only addresses corresponding to buffers in use.

6. The apparatus of claim 3 wherein the logic further comprises detection logic that compares the index values to thresholds to detect overflow and underflow conditions.

7. The apparatus of claim 1, wherein the logic further comprises a ring base address that points to the top of the ring structure and a ring bound address that points to the bottom of the ring structure.

8. The apparatus of claim 1, wherein the logic further comprises a ring base address that points to the top of the ring structure and a ring fixed address that points to the bottom of the ring structure.

9. The apparatus of claim 1, wherein the logic further comprises a ring base address that points to the top of the ring structure and a ring programmable size address that points to the bottom of the ring structure.

10. The apparatus of claim 1 wherein the logic further comprises a mapping of a burst access address to the entry pointed to by the first pointer and a mapping of a single access address to the entry pointed to by the second pointer.

11. The apparatus of claim 1 wherein the logic further comprises prefetching bursts of descriptors and caching them locally.

12. The apparatus of claim 1, wherein the logic further comprises prefetching groups of memory elements using a burst access method.

13. The apparatus of claim 1, wherein the logic further comprises accumulating retired resources and return them using bursts.

14. The apparatus of claim 1, wherein the logic further comprises accumulating retired buffer pointers and allocating by private path to a receive unit.

15. A method comprising:
   providing a first pointer and a second pointer for separately indexing into a ring structure of indexed entries corresponding to addresses of memory resources;
   using the first pointer to access entries in the ring structure in bursts; and
   using the second pointer to access entries in the ring structure singly.

16. The method of claim 15 wherein the first pointer is stored in a first register and comprises a first index value and the second pointer is stored in a second register and comprises a second index value.

17. The method of claim 16 further comprising:
   incrementing the first index value for burst access to read buffers and decrementing the first index value for burst write access to write buffers; and
   decrementing the second index value for single read access to read buffers and incrementing the second index value for single write access to write buffers.

18. The method of claim 17 wherein the read buffers correspond to addresses of buffers in use and the written buffers correspond to addresses of buffers which are free for allocation.

19. The method of claim 15 further comprising:
   maintaining a ring base address that points to the top of the ring structure and a ring bound address that points to the bottom of the ring structure.

20. The method of claim 15 further comprising:
   maintaining a ring base address that points to the top of the ring structure and a ring fixed address that points to the bottom of the ring structure.

21. The method of claim 15 further comprising:
   maintaining a ring base address that points to the top of the ring structure and a ring programmable address that points to the bottom of the ring structure.

22. The method of claim 15 wherein the first register and the second register store an indicator in association with the index values to indicate, when the first and second index values are equal, if the ring structure contains only addresses corresponding to buffers in use.

23. The method of claim 15 further comprising comparing the index values to thresholds to detect overflow and underflow conditions.

24. The method of claim 15 further comprising:
mapping a burst access address to the entry pointed to by the first pointer; and
mapping a single access address to the entry pointed to by the second pointer.

25. The method of claim 15, further comprising:
prefetching bursts of descriptors and caching them locally.

26. The method of claim 15, further comprising:
prefetching groups of memory elements using a burst access method.

27. The method of claim 15, further comprising:
accumulating retired resources; and
returning the retired resources using a burst.

28. The method of claim 15, further comprising:
accumulating retired buffer pointers; and
allocating by private path to a receive unit.

29. A system, comprising:
at least one physical layer device;
at least one Ethernet medium access control device coupled to the at least one physical layer device;
at least one processor to process packet data received via the at least one physical layer device and the at least one medium access control device;
memory to store entries that each include an address of a memory resource; and
logic coupled to the processing device and the memory, usable by the at least one processor to access the entries in bursts and singly.

30. The system of claim 29, wherein the at least one processor comprises multiple processors.

31. The system of claim 29 wherein:
the entries are stored in a ring structure; and
the logic includes a first pointer and a second pointer for separately indexing into the ring structure, the first pointer usable by the processing device to access entries in bursts and the second pointer usable by the processing device to access entries singly.

32. The system of claim 31, wherein the logic further comprises:
logic that operates to increment the first index value for burst read access to buffer addresses and to decrement the first index value for burst write accesses to buffer addresses; and
logic that operates to decrement the second index value for single read access to read buffers and to increment the second index value for single write access to write buffers.

33. A system, comprising:
a ring structure of identifiers that identify shared resources in a pool that are available for allocation to autonomous data processing activities;
memory to store a first pointer for indexing into a first location in the ring structure and a second pointer for indexing into a second location in the ring structure;
burst allocation logic to allocate shared resources from the pool to a data processing activity in a burst and change one of the first pointer and the second pointer to reflect the burst allocation;
burst return logic to return shared resources to the pool in a burst and change one of the first pointer and the second pointer to reflect the burst return;
single allocation logic to allocate a single shared resources from the pool to a data processing activity and change one of the first pointer and the second pointer to reflect the single allocation; and
single return logic to return a single shared resources to the pool and change one of the first pointer and the second pointer to reflect the single return.

34. The system of claim 33, wherein the ring structure comprises a freelist of identifiers of memory locations that are available for allocation to microengines in a multi-threaded processor.

35. The system of claim 34, further comprising:
a transmit buffer retirement unit to receive and retire identifiers of the shared resources, the transmit buffer retirement unit including:
a packing unit to pack identifiers into groups for burst transmission to the freelist, and
a first output to burst transmit packed identifiers to the freelist; and
a receive unit to receive retired identifiers from both the transmit buffer retirement unit and the freelist.

* * * * *